(12) United States Patent
Xu et al.

(10) Patent No.: US 10,264,179 B2
(45) Date of Patent: Apr. 16, 2019

(54) PHOTOGRAPHING APPARATUS

(71) Applicant: Huawei Technologies Co., Ltd., Shenzhen (CN)

(72) Inventors: Jing Xu, Shenzhen (CN); Yingtao Li, Shenzhen (CN); Limin Xia, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 239 days.

(21) Appl. No.: 15/176,594

(22) Filed: Jun. 8, 2016

(65) Prior Publication Data

US 2016/0286124 A1 Sep. 29, 2016

Related U.S. Application Data

(63) Continuation of application No. PCT/CN2014/080816, filed on Jun. 26, 2014.

(30) Foreign Application Priority Data

Dec. 12, 2013 (CN) .......................... 2013 1 0683932

(51) Int. Cl.
*H04N 5/232* (2006.01)
*H04N 5/225* (2006.01)
(Continued)

(52) U.S. Cl.
CPC ......... *H04N 5/23238* (2013.01); *G02B 13/06* (2013.01); *G02B 27/1066* (2013.01);
(Continued)

(58) Field of Classification Search
CPC combination set(s) only.
See application file for complete search history.

(56) References Cited

U.S. PATENT DOCUMENTS 6,571,023 B1 * 5/2003 Aizawa ................. G06T 1/0007
348/E5.028
6,992,699 B1 * 1/2006 Vance ..................... H04N 7/142
348/207.99
(Continued)

FOREIGN PATENT DOCUMENTS

CN 101493634 A 7/2009
CN 102281428 A 12/2011
(Continued)

OTHER PUBLICATIONS

Machine Translation and Abstract of Chinese Publication No. CN101493634, Jul. 29, 2009, 12 page.
(Continued)

*Primary Examiner* — Tung T Vo
(74) *Attorney, Agent, or Firm* — Conley Rose, P.C.

(57) ABSTRACT

The present disclosure discloses a photographing apparatus, where the photographing apparatus includes a first lens and a second lens, where the first lens and the second lens are separately disposed on two adjacent surfaces of the photographing apparatus, the first lens is configured to acquire a first image, and the second lens is configured to acquire a second image; a light control unit, disposed at a juncture of an optical axis of the first lens and an optical axis of the second lens, and configured to transmit or reflect the first image, and reflect or transmit the second image; and an image sensing unit configured to collect the first image and the second image using the light control unit, and synthesize the first image and the second image into an image of a wide field of view.

8 Claims, 4 Drawing Sheets

(51) Int. Cl.
*H04N 5/238* (2006.01)
*G02B 13/06* (2006.01)
*G02B 27/10* (2006.01)

(52) U.S. Cl.
CPC ......... *H04N 5/2254* (2013.01); *H04N 5/2259* (2013.01); *H04N 5/238* (2013.01); *H04N 5/23296* (2013.01)

(56) References Cited

U.S. PATENT DOCUMENTS

| | | | | |
|---|---|---|---|---|
| 8,194,138 | B2* | 6/2012 | Shen | G06F 1/1616 348/207.1 |
| 8,317,688 | B2* | 11/2012 | Glozman | A61B 1/00096 600/173 |
| 8,390,721 | B2* | 3/2013 | Liu | G02B 13/0055 348/335 |
| 2002/0021354 | A1* | 2/2002 | Suzuki | H04N 5/23209 348/46 |
| 2003/0016214 | A1 | 1/2003 | Sukeno et al. | |
| 2005/0062869 | A1* | 3/2005 | Zimmermann | G02B 13/06 348/335 |
| 2007/0189763 | A1* | 8/2007 | Kojima | G03B 15/00 396/351 |
| 2008/0019684 | A1* | 1/2008 | Shyu | G03B 17/245 396/332 |
| 2008/0025712 | A1* | 1/2008 | Furuya | G03B 17/18 396/88 |
| 2008/0151041 | A1* | 6/2008 | Shafer | A61B 1/00193 348/45 |
| 2008/0266443 | A1* | 10/2008 | Lee | G02B 15/00 348/344 |
| 2009/0128664 | A1* | 5/2009 | He | G02B 15/02 348/240.1 |
| 2010/0045773 | A1* | 2/2010 | Ritchey | G02B 13/06 348/36 |
| 2010/0097707 | A1 | 4/2010 | Seo | |
| 2011/0063446 | A1* | 3/2011 | McMordie | G06K 9/00255 348/159 |
| 2011/0316968 | A1* | 12/2011 | Taguchi | H04N 5/23238 348/36 |
| 2012/0154621 | A1 | 6/2012 | Kuo et al. | |
| 2013/0057655 | A1 | 3/2013 | Su et al. | |
| 2013/0235226 | A1* | 9/2013 | Karn | H04N 5/23241 348/220.1 |
| 2013/0258152 | A1* | 10/2013 | Balannik | H04N 13/021 348/308 |
| 2014/0055624 | A1* | 2/2014 | Gaines | H04N 5/2254 348/207.1 |
| 2014/0063322 | A1* | 3/2014 | Chan | G03B 17/17 348/335 |
| 2014/0071330 | A1* | 3/2014 | Zhang | H04N 5/2258 348/345 |
| 2015/0092102 | A1* | 4/2015 | Chan | G02B 5/08 348/360 |

FOREIGN PATENT DOCUMENTS

| | | |
|---|---|---|
| CN | 202143153 U | 2/2012 |
| CN | 102547080 A | 7/2012 |
| CN | 102595037 A | 7/2012 |
| CN | 102984530 A | 3/2013 |
| CN | 103197424 A | 7/2013 |
| JP | H08254750 A | 10/1996 |
| JP | H11051844 A | 2/1999 |
| JP | 2001033850 A | 2/2001 |
| JP | 2001223924 A | 8/2001 |
| JP | 2004260413 A | 9/2004 |
| JP | 2004282773 A | 10/2004 |
| JP | 2005031468 A | 2/2005 |
| JP | 2005277817 A | 10/2005 |
| JP | 2010032759 A | 2/2010 |
| JP | 2010107662 A | 5/2010 |
| JP | 2011048120 A | 3/2011 |
| JP | 2011150068 A | 8/2011 |
| JP | 2012124892 A | 6/2012 |
| KR | 100593896 B1 | 6/2006 |
| WO | 2004054239 A1 | 6/2004 |

OTHER PUBLICATIONS

Foreign Communication From A Counterpart Application, Chinese Application No. 201310683932.6, Chinese Office Action dated Jan. 17, 2018, 7 pages.
Machine Translation and Abstract of Japanese Publication No. JP2005277817, Oct. 6, 2005, 19 pages.
Machine Translation and Abstract of Japanese Publication No. JP2010107662, May 13, 2010, 25 pages.
Machine Translation and Abstract of Korean Publication No. KR100593896, Jun. 20, 2006, 10 pages.
Foreign Communication From A Counterpart Application, Korean Application No. 20167017265, Korean Office Action dated Oct. 18, 2017, 6 pages.
Foreign Communication From A Counterpart Application, Korean Application No. 20167017265, English Translation of Korean Office Action dated Oct. 18, 2017, 4 pages.
Partial English Translation and Abstract of Chinese Patent Application No. CN102281428, Nov. 28, 2016, 5 pages.
Partial English Translation and Abstract of Chinese Patent Application No. CN103197424, Jun. 21, 2016, 4 pages.
Partial English Translation and Abstract of Chinese Patent Application No. CN202143153, Jun. 21, 2016, 3 pages.
Foreign Communication From A Counterpart Application, European Application No. 14870048.7, Extended European Search Report dated Sep. 29, 2016, 8 pages.
Foreign Communication From A Counterpart Application, PCT Application No. PCT/CN2014/080816, English Translation of International Search Report dated Oct. 9, 2014, 2 pages.
Foreign Communication From A Counterpart Application, PCT Application No. PCT/CN2014/080816, English Translation of Written Opinion dated Oct. 9, 2014, 11 pages.
Machine Translation and Abstract of Japanese Publication No. JPH11051844, Feb. 26, 1999, 8 pages.
Machine Translation and Abstract of Japanese Publication No. JP2001223924, Aug. 17, 2001, 23 pages.
Machine Translation and Abstract of Japanese Publication No. JP2004260413, Sep. 16, 2004, 14 pages.
Machine Translation and Abstract of Japanese Publication No. JP2004282773, Oct. 7, 2004, 26 pages.
Machine Translation and Abstract of Japanese Publication No. JP2005031468, Feb. 3, 2005, 17 pages.
Machine Translation and Abstract of Japanese Publication No. JP2010032759, Feb. 12, 2010, 65 pages.
Machine Translation and Abstract of Japanese Publication No. JP2011048120, Mar. 10, 2011, 27 pages.
Machine Translation and Abstract of Japanese Publication No. JP2011150068, Aug. 4, 2011, 24 pages.
Machine Translation and Abstract of International Publication No. WO2004054239, Jun. 24, 2004, 18 pages.
Foreign Communication From A Counterpart Application, Japanese Application No. 2016-538678, Japanese Office Action dated Aug. 8, 2017, 8 pages.
Foreign Communication From A Counterpart Application, Japanese Application No. 2016-538678, English Translation of Japanese Office Action dated Aug. 8, 2017, 10 pages.
Machine Translation and Abstract of Japanese Publication No. JP2012124892, Jun. 28, 2012, 9 pages.
Machine Translation and Abstract of Japanese Publication No. JPH08254750, Oct. 1, 1996, 7 pages.
Foreign Communication From A Counterpart Application, Japanese Application No. 2016-538678, Japanese Office Action dated Apr. 3, 2018, 7 pages.

(56) References Cited

OTHER PUBLICATIONS

Foreign Communication From A Counterpart Application, Japanese Application No. 2016-538678, English Translation of Japanese Office Action dated Apr. 3, 2018, 8 pages.

* cited by examiner

PHOTOGRAPHING APPARATUS

CROSS-REFERENCE TO RELATED APPLICATIONS

This application is a continuation of International Application No. PCT/CN2014/080816, filed on Jun. 26, 2014, which claims priority to Chinese Patent Application No. 201310683932.6, filed on Dec. 12, 2013, both of which are hereby incorporated by reference in their entireties.

TECHNICAL FIELD

The present disclosure relates to the field of photographing technologies, and in particular, to a photographing apparatus.

BACKGROUND

Currently, a camera of a mobile phone is generally disposed at the back or front of the mobile phone. When photographing, a user needs to lift the mobile phone to a position that is almost parallel to a line of sight, and generally uses two hands, with one hand to hold the mobile phone, and the other hand to perform a photographing operation.

For a wide-angle lens in the prior art, to obtain a wider field of view, that is, to collect light in a wider range, the first sheet of lens of the wide-angle lens is generally relatively protrusive, and a surface curvature is relatively great. However, a wide-angle lens of a relatively large size cannot be selected as a camera lens of a mobile phone. Therefore, the camera of the mobile phone cannot achieve a wide-angle effect.

SUMMARY

Embodiments of the present disclosure provide a photographing apparatus to solve a problem that a camera of a mobile phone cannot achieve a wide-angle effect.

According to a first aspect, a photographing apparatus is provided, where the photographing apparatus includes a first lens and a second lens, where the first lens and the second lens are separately disposed on two adjacent surfaces of the photographing apparatus, the first lens is configured to acquire a first image, and the second lens is configured to acquire a second image; a light control unit, disposed at a juncture of an optical axis of the first lens and an optical axis of the second lens, and configured to transmit or reflect the first image, and reflect or transmit the second image; and an image sensing unit configured to collect the first image and the second image using the light control unit, and synthesize the first image and the second image into an image of a wide field of view.

With reference to an implementation manner of the first aspect, in a first implementation manner of the first aspect, the first lens acquires the first image at a first time point, and the second lens acquires the second image at a second time point, where the first time point is different from the second time point.

With reference to the implementation manner of the first aspect or the first implementation manner of the first aspect, in a second implementation manner of the first aspect, the light control unit is a semi-transmissive semi-reflective lens, the first image acquired by the first lens is transmitted by the semi-transmissive semi-reflective lens to the image sensing unit, and the second image acquired by the second lens is reflected by the semi-transmissive semi-reflective lens to the image sensing unit.

With reference to the implementation manner of the first aspect or the first implementation manner of the first aspect, in a third implementation manner of the first aspect, the light control unit transmits, at the first time point, the first image acquired by the first lens, and the light control unit reflects, at the second time point, the second image acquired by the second lens.

With reference to the implementation manner of the first aspect to the third implementation manner of the first aspect, in a fourth implementation manner of the first aspect, a photographing unit further includes a synchronization clock unit configured to synchronize the first lens and the second lens with the image sensing unit, so that time of acquiring the first image by the first lens and time of acquiring the second image by the second lens separately match exposure time of the image sensing unit; or configured to synchronize the light control unit with the image sensing unit, so that time of the transmitting or the reflecting by the light control unit matches exposure time of the image sensing unit.

With reference to the implementation manner of the first aspect to the fourth implementation manner of the first aspect, in a fifth implementation manner of the first aspect, the photographing unit further includes a lens group unit, disposed between the light control unit and the image sensing unit to perform aberration compensation or zooming on the first image and the second image.

With reference to the implementation manner of the first aspect to the fifth implementation manner of the first aspect, in a sixth implementation manner of the first aspect, the photographing unit further includes a delay unit and a microlens array that are disposed between the light control unit and the image sensing unit, where the microlens array is disposed between the delay unit and the image sensing unit to perform zooming on the first image and the second image.

With reference to the implementation manner of the first aspect to the sixth implementation manner of the first aspect, in a seventh implementation manner of the first aspect, the two adjacent surfaces form a first corner, the photographing unit is disposed at a corner adjacent to the first corner, and the photographing apparatus performs rotational photographing around a central axis of the photographing apparatus to acquire an image of an extra-wide field of view.

With reference to the implementation manner of the first aspect to the seventh implementation manner of the first aspect, in an eighth implementation manner of the first aspect, the light control unit intersects the optical axis of the first lens or the optical axis of the second lens at a 45° angle.

In the present disclosure, a first lens is configured to acquire a first image, a second lens is configured to acquire a second image, an image sensing unit uses a light control unit to collect the first image acquired by the first lens and the second image acquired by the second lens, and the image sensing unit synthesizes the first image and the second image into an image of a wide field of view, so as to achieve a wide-angle effect.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
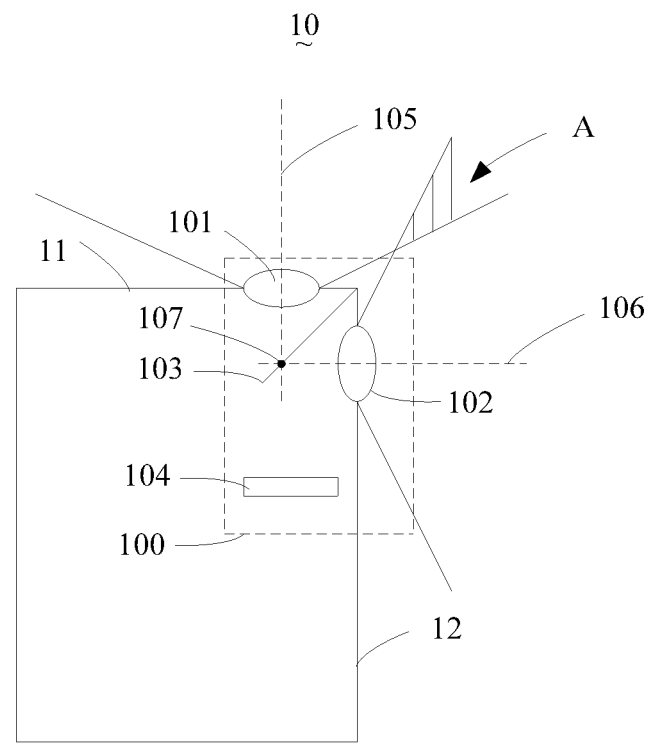
FIG. 1 is a schematic structural diagram of a photographing apparatus according to a first embodiment of the present disclosure.

Referring to FIG. 1, FIG. 1 is a schematic structural diagram of a photographing apparatus 10 according to a first embodiment of the present disclosure. As shown in FIG. 1, the photographing apparatus 10 disclosed in this embodiment includes at least one photographing unit 100. The photographing unit 100 includes a first lens 101, a second lens 102, a light control unit 103, and an image sensing unit 104.

In this embodiment, the first lens 101 and the second lens 102 are separately disposed on two adjacent surfaces of the photographing apparatus 10. Optionally, the first lens 101 and the second lens 102 are disposed on two adjacent lateral sides of the photographing apparatus 10. The first lens 101 is disposed in a right-sided position on a front lateral side 11 of the photographing apparatus 10, and the second lens 102 is disposed in a forward position on a right lateral side 12 of the photographing apparatus 10. A certain overlap area A exists between a field of view of the first lens 101 and a field of view of the second lens 102. The first lens 101 is configured to acquire a first image, and the second lens 102 is configured to acquire a second image. In addition, both the first lens 101 and the second lens 102 include multiple sheets of glass or plastic lens. Specifications of the first lens 101 are the same as specifications of the second lens 102. In another embodiment of the present disclosure, specifications of the first lens 101 may be different from specifications of the second lens 102.

The light control unit 103 is disposed at a juncture 107 of an optical axis 105 of the first lens 101 and an optical axis 106 of the second lens 102. Optionally, the light control unit 103 intersects the optical axis 105 of the first lens 101 or the optical axis 106 of the second lens 102 at a 45° angle. The light control unit 103 disclosed in this embodiment intersects both the optical axis 105 of the first lens 101 and the optical axis 106 of the second lens 102 at a 45° angle, and the first lens 101 and the second lens 102 are mirror-symmetrical with respect to the light control unit 103. In addition, the light control unit 103 is configured to transmit or reflect the first image, and reflect or transmit the second image. The light control unit 103 disclosed in this embodiment is configured to transmit the first image and reflect the second image, so that both the first image and the second image can arrive at the image sensing unit 104.

In this embodiment, the image sensing unit 104 is configured to collect, using the light control unit 103, the first image acquired by the first lens 101, and collect, using the light control unit 103, the second image acquired by the second lens 102, so that one image sensing unit 104 is shared. The image sensing unit 104 synthesizes the first image and the second image into an image of a wide field of view to achieve a wide-angle effect. In addition, in the photographing apparatus 10 in this embodiment, one image sensing unit 104 is shared, thereby reducing a size of the photographing apparatus 10 and reducing costs.

Optionally, the photographing apparatus 10 in this embodiment is a mobile phone that has a photographing function. In another embodiment of the present disclosure, the photographing apparatus 10 may also be a palmtop computer, a tablet computer, or the like that has a photographing function.

Figure 2:
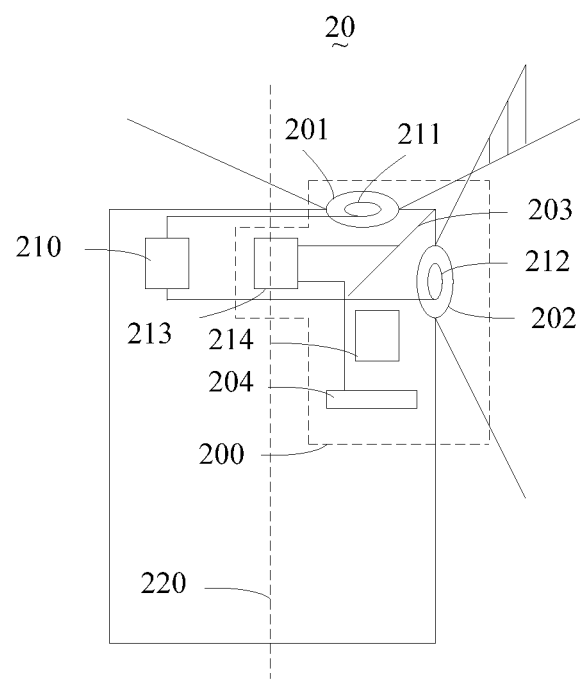
FIG. 2 is a schematic structural diagram of a photographing apparatus according to a second embodiment of the present disclosure.

The present disclosure further provides a photographing apparatus according to a second embodiment, which is described in detail on the basis of the photographing apparatus 10 disclosed in the first embodiment. As shown in FIG. 2, the photographing apparatus 20 disclosed in this embodiment further includes a processor 210, where the processor 210 is separately connected to the first lens 201 and the second lens 202.

In this embodiment, the first lens 201 includes a first control variable aperture 211, and the second lens 202 includes a second control variable aperture 212. The processor 210 is separately connected to the first control variable aperture 211 and the second control variable aperture 212, and provides a control signal for the first control variable aperture 211 and the second control variable aperture 212, so that the processor 210 uses the first control variable aperture 211 to control the first lens 201 to acquire the first image at a first time point t1, and uses the second control variable aperture 212 to control the second lens 202 to acquire the second image at a second time point t2. Optionally, values of the first time point t1 and the second time point t2 are 0.08-0.11 s, and the first time point t1 is different from the second time point t2. In another embodiment of the present disclosure, the first lens 201 and the second lens 202 may, in another manner, implement that the first lens 201 acquires the first image at the first time point t1 and that the second lens 202 acquires the second image at the second time point t2. For example, both the first lens 201 and the second lens 202 may include a controllable shutter.

In this embodiment, the light control unit 203 is a semi-transmissive semi-reflective lens. One side of the semi-transmissive semi-reflective lens can fully transmit light, and the other side can fully reflect light, which are characterized by low absorption. At the first time point t1, the first lens 201 acquires the first image, and the first image is fully transmitted by the semi-transmissive semi-reflective lens to the image sensing unit 204; at the second time point t2, the second lens 202 acquires the second image, and the second image is fully reflected by the semi-transmissive semi-reflective lens to the image sensing unit 204.

The photographing unit 200 disclosed in this embodiment further includes a synchronization clock unit 213, where the synchronization clock unit 213 is separately connected to the first lens 201, the second lens 202, and the image sensing unit 204. The synchronization clock unit 213 is configured to synchronize the first lens 201 and the second lens 202 with the image sensing unit 204, so that turn-on/turn-off time of the first control variable aperture 211 matches exposure time of the image sensing unit 204, where the turn-on/turn-off time of the first control variable aperture 211 is time of acquiring the first image by the first lens 201; and turn-on/turn-off time of the second control variable aperture 212 matches the exposure time of the image sensing unit 204, where the turn-on/turn-off time of the second control variable aperture 212 is time of acquiring the second image by the second lens 202. Optionally, a time difference of the synchronization clock unit 213 is 10 milliseconds (ms). In another embodiment of the present disclosure, the synchronization clock unit 213 may be disposed on another device of the photographing apparatus 20. For example, the synchronization clock unit 213 is disposed on the processor 210.

In this embodiment, the image sensing unit 204 is disposed on image planes of the first lens 201 and the second lens 202. The image sensing unit 204 uses a semi-transmissive semi-reflective lens to collect the first image at the first time point t1 and collect the second image at the second time point t2, and uses an image splicing algorithm to splice and synthesize the first image and the second image into an image of a wide field of view, so as to achieve a wide-angle effect.

Optionally, the photographing unit 200 further includes a lens group unit 214. The lens group unit 214 is disposed between the light control unit 203 and the image sensing unit 204. When the lens group unit 214 is an aberration compensation lens group, the lens group unit 214 is configured to compensate for an aberration generated after light of the first lens 201 and the second lens 202 is transmitted or reflected by the light control unit 203, so as to reduce an image aberration on the image sensing unit 204 and perform aberration compensation on the first image and the second image. When the lens group unit 214 is a zoom lens group, the lens group unit 214 is configured to change a focal length of the photographing apparatus 20, so as to zoom on the first image and the second image, where the zoom lens group may include a device such as a voice coil motor.

In addition, a user may perform rotational photographing using a central axis 220 of the photographing apparatus 20 as a rotation axis, and the image sensing unit 204 splices and synthesizes multiple images into an image with a dome-screen effect.

Figure 3:
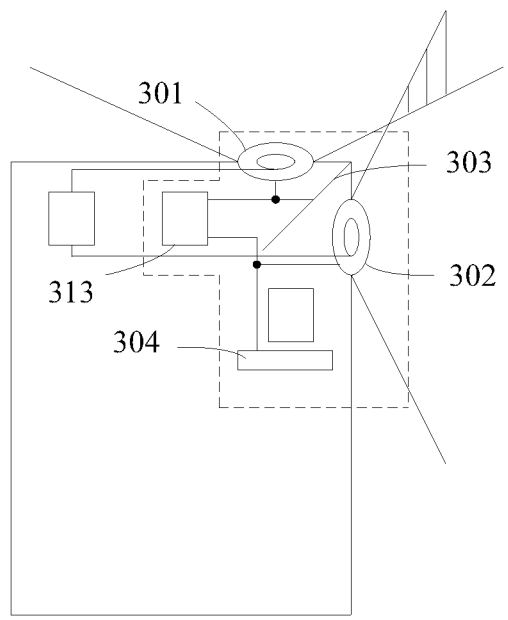
FIG. 3 is a schematic structural diagram of a photographing apparatus according to a third embodiment of the present disclosure.

The present disclosure further provides a photographing apparatus according to a third embodiment, which is described in detail on the basis of the photographing apparatus 20 disclosed in the second embodiment. The photographing apparatus disclosed in this embodiment differs from the photographing apparatus 20 disclosed in the second embodiment as follows. As shown in FIG. 3, the light control unit 303 in this embodiment is loaded/unloaded with a voltage at the first time point t1, and the light control unit 303 fully transmits the first image; and the light control unit 303 is unloaded/loaded with a voltage at the second time point t2, and the light control unit 303 fully reflects the second image. Therefore, the light control unit 303 transmits the first image at the first time point t1 and reflects the second image at the second time point t2.

The synchronization clock unit 313 is separately connected to the first lens 301, the second lens 302, the light control unit 303, and the image sensing unit 304, so as to synchronize the first lens 301, the second lens 302, and the light control unit 303 with the image sensing unit 304. The image sensing unit 304 uses the light control unit 303 to collect the first image at the first time point t1 and collect the second image at the second time point t2, and uses an image splicing algorithm to splice and synthesize the first image and the second image into an image of a wide field of view, so as to achieve a wide-angle effect.

Figure 4:
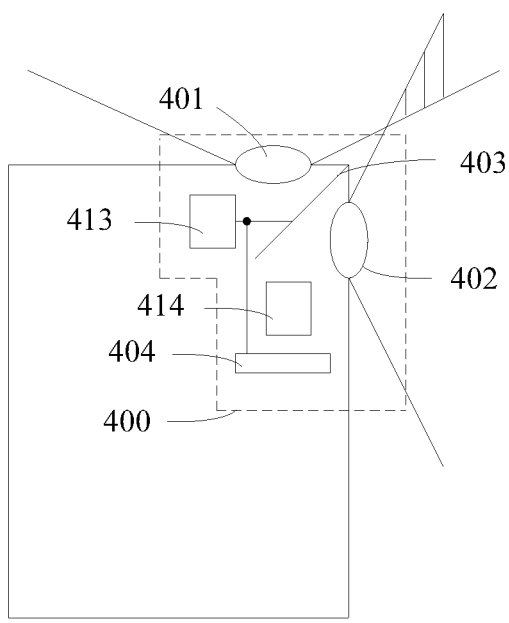
FIG. 4 is a schematic structural diagram of a photographing apparatus according to a fourth embodiment of the present disclosure.

The present disclosure further provides a photographing apparatus according to a fourth embodiment, which is described in detail on the basis of the photographing apparatus 10 disclosed in the first embodiment. As shown in FIG. 4, the photographing unit 400 disclosed in this embodiment further includes a synchronization clock unit 413.

In this embodiment, when a user triggers a photographing instruction, the first lens 401 acquires the first image, and the second lens 402 acquires the second image. The light control unit 403 is loaded/unloaded with a voltage at the first time point t1, and the light control unit 403 fully transmits the first image and the light control unit 403 fully transmits the second image at the same time; the light control unit 403 is unloaded/loaded with a voltage at the second time point t2, and the light control unit 403 fully blocks the first image and the light control unit 403 fully reflects the second image at the same time. Therefore, the light control unit 403 transmits the first image at the first time point t1 and reflects the second image at the second time point t2.

In this embodiment, the synchronization clock unit 413 is separately connected to the light control unit 403 and the image sensing unit 404 to synchronize the light control unit 403 with the image sensing unit 404, so that transmitting or reflecting time of the light control unit 403 matches exposure time of the image sensing unit 404. The synchronization clock unit 413 is the same as the synchronization clock unit 213 disclosed in the second embodiment. The image sensing unit 404 uses the light control unit 403 to collect the first image at the first time point t1 and collect the second image at the second time point t2, and uses an image splicing algorithm to splice and synthesize the first image and the second image into an image of a wide field of view, so as to achieve a wide-angle effect.

Optionally, the photographing unit further includes a lens group unit 414, where the lens group unit 414 is disposed between the light control unit 403 and the image sensing unit 404. When the lens group unit 414 is an aberration compensation lens group, the lens group unit 414 is configured to compensate for an aberration generated after light of the first lens 401 and the second lens 402 is transmitted or reflected by the light control unit 403, so as to reduce an image aberration on the image sensing unit 404 and perform aberration compensation on the first image and the second image. When the lens group unit 414 is a zoom lens group, the lens group unit 414 is configured to change a focal length of the photographing apparatus, so as to zoom on the first image and the second image, where the zoom lens group may include a device such as a voice coil motor.

Figure 5:
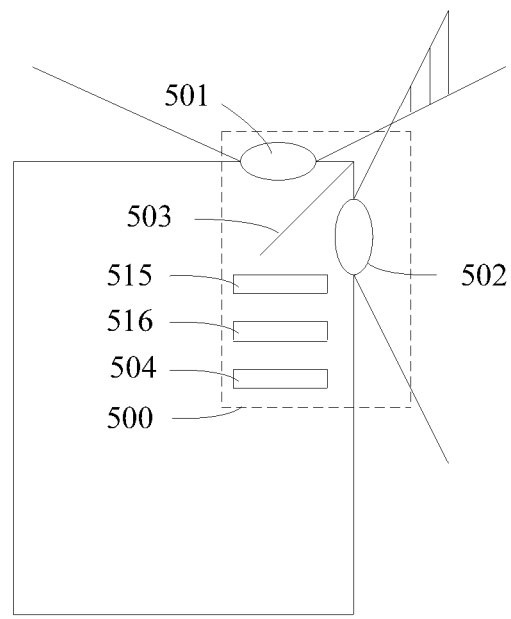
FIG. 5 is a schematic structural diagram of a photographing apparatus according to a fifth embodiment of the present disclosure.

The present disclosure further provides a photographing apparatus according to a fifth embodiment, which is described in detail on the basis of the photographing apparatus 10 disclosed in the first embodiment. As shown in FIG. 5, the photographing unit 500 disclosed in this embodiment further includes a delay unit 515 and a microlens array 516. The delay unit 515 and the microlens array 516 are disposed between the light control unit 503 and the image sensing unit 504. That is, the delay unit 515 is disposed near the light control unit 503, and the microlens array 516 is disposed between the delay unit 515 and the image sensing unit 504. The delay unit 515 is configured to delay image planes of the first lens 501 and the second lens 502 until a plane after the delay unit 515, and has a zooming function. The microlens array 516 is configured to project light, which passes through the delay unit 515, onto the image sensing unit 504, so as to perform zooming on the first image and the second image.

Figure 6:
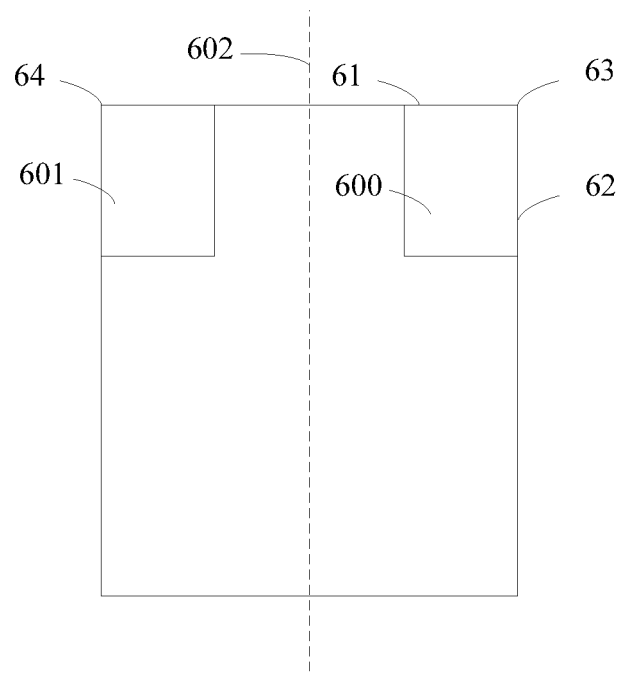
FIG. 6 is a schematic structural diagram of a photographing apparatus according to a sixth embodiment of the present disclosure.

The present disclosure further provides a photographing apparatus according to a sixth embodiment. As shown in FIG. 6, the photographing apparatus 60 disclosed in this embodiment includes a first photographing unit 600 and a second photographing unit 601, and two adjacent surfaces of the photographing apparatus 60 form a first corner 63. Optionally, a front lateral side 61 and a right lateral side 62 of the photographing apparatus 60 form the first corner 63 and a corner 64 adjacent to the first corner 61. The first photographing unit 600 is disposed at the first corner 63, and the second photographing unit 601 is disposed at the corner 64. The first photographing unit 600 and the second photographing unit 601 may be the photographing unit 100 in the first embodiment, the photographing unit 200 in the second embodiment, the photographing unit in the third embodiment, the photographing unit 400 in the fourth embodiment, or the photographing unit 500 in the fifth embodiment. In addition, the photographing apparatus 60 performs rotational photographing using a central axis 602 of the photographing apparatus 60 as a rotation axis, so as to acquire an image of an extra-wide field of view.

Figure 7:
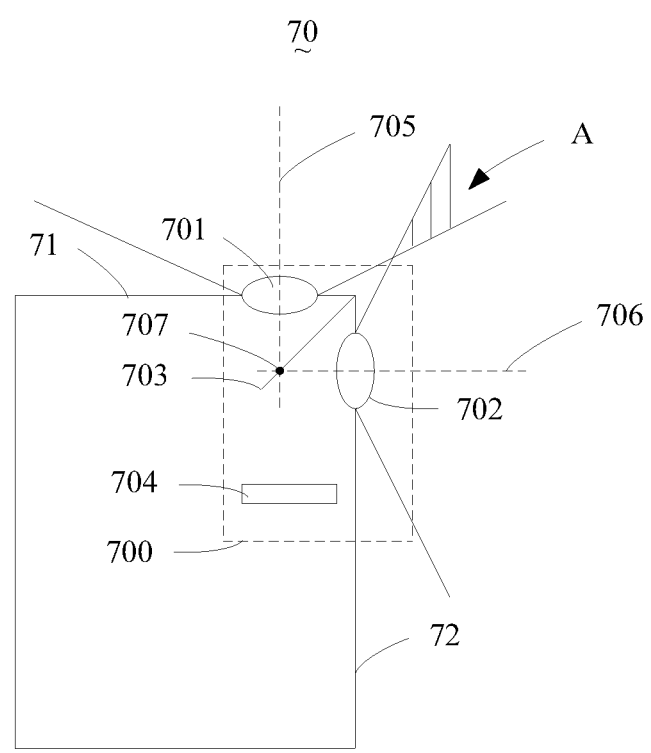
FIG. 7 is a schematic structural diagram of a photographing apparatus according to a seventh embodiment of the present disclosure.

The present disclosure further provides a photographing apparatus according to a seventh embodiment. As shown in FIG. 7, the photographing apparatus 70 disclosed in this embodiment includes at least one photographing device 700. The photographing device 700 includes at least a first lens 701 and a second lens 702, a light controller 703, and an image sensor 704.

In this embodiment, the first lens 701 and the second lens 702 are disposed on two adjacent lateral sides of the photographing apparatus 70. That is, the first lens 701 is disposed in a right-sided position on a front lateral side 71 of the photographing apparatus 70, and the second lens 702 is disposed in a forward position on a right lateral side 72 of the photographing apparatus 70. A certain overlap area A exists between a field of view of the first lens 701 and a field of view of the second lens 702. The first lens 701 is configured to acquire a first image, and the second lens 702 is configured to acquire a second image.

The light controller 703 is disposed at a juncture 707 of an optical axis 705 of the first lens 701 and an optical axis 706 of the second lens 702. Optionally, the light controller 703 intersects the optical axis 705 of the first lens 701 or the optical axis 706 of the second lens 702 at a 45° angle. The light controller 703 disclosed in this embodiment intersects both the optical axis 705 of the first lens 701 and the optical axis 706 of the second lens 702 at a 45° angle, and the first lens 701 and the second lens 702 are mirror-symmetrical with respect to the light controller 703. In addition, the light controller 703 is configured to transmit or reflect the first image or the second image. The light controller 703 disclosed in this embodiment is configured to transmit the first image and reflect the second image, so that both the first image and the second image can arrive at the image sensor 704.

In this embodiment, the image sensor 704 is configured to collect, using the light controller 703, the first image at a first time point t1, and collect, using the light controller 703, the second image at a second time point t2, so that one image sensor 704 is shared. Optionally, values of the first time point t1 and the second time point t2 may be 0.08-0.11 s. The image sensor 704 synthesizes the first image and the second image into an image of a wide field of view to achieve a wide-angle effect. In addition, in the photographing apparatus 70 in this embodiment, one image sensor 704 is shared, thereby reducing a size of the photographing apparatus 70 and reducing costs.

In conclusion, in the present disclosure, a first lens is configured to acquire a first image, a second lens is configured to acquire a second image, and an image sensing unit uses a light control unit to collect the first image acquired by the first lens and the second image acquired by the second lens, and synthesizes the first image and the second image into an image of a wide field of view, so as to achieve a wide-angle effect. In addition, in the present disclosure, one image sensing unit is shared, thereby reducing a size of the photographing apparatus and reducing costs.

The foregoing descriptions are merely embodiments of the present disclosure, and the protection scope of the present disclosure is not limited thereto. All equivalent structure or process changes made according to the content of this specification and accompanying drawings in the present disclosure or by directly or indirectly applying the present disclosure in other related technical fields shall fall within the protection scope of the present disclosure.

What is claimed is:

1. A photographing apparatus having at least one photographing unit, the photographing unit comprising:
    a first lens having a first control variable aperture configured to control the first lens to acquire a first image at a first time point;
    a second lens having a second control variable aperture configured to control the second lens to acquire a second image at a second time point, the first time point being different from the second time point, and the first lens and the second lens being separately disposed on two adjacent surfaces of the photographing apparatus;
    a light controller disposed at a juncture of an optical axis of the first lens and an optical axis of the second lens, the light controller being configured to transmit or reflect the first image, and reflect or transmit the second image;
    an image sensor configured to:
        collect the first image and the second image using the light controller; and
        synthesize the first image and the second image into an image of a wide field of view; and
    a synchronization clock unit configured to synchronize the first lens and the second lens with the image sensor, such that time of acquiring the first image by the first lens and time of acquiring the second image by the second lens separately match exposure time of the image sensor,
    wherein the two adjacent surfaces of the photographing apparatus form a first corner, wherein the photographing unit is disposed at a corner adjacent to the first corner, and wherein the photographing apparatus performs rotational photographing around a central axis of the photographing apparatus to acquire an image of an extra-wide field of view.

2. The photographing apparatus according to claim 1, wherein the light controller is a semi-transmissive semi-reflective lens, the first image acquired by the first lens being transmitted by the semi-transmissive semi-reflective lens to the image sensor, and the second image acquired by the second lens being reflected by the semi-transmissive semi-reflective lens to the image sensor.

3. The photographing apparatus according to claim 1, wherein the light controller transmits the first image acquired by the first lens at the first time point, and the light controller reflecting the second image acquired by the second lens at the second time point.

4. The photographing apparatus according to claim 1, wherein the synchronization clock unit is further configured to synchronize the light controller with the image sensor, such that time of the transmitting or the reflecting by the light controller matches exposure time of the image sensor.

5. The photographing apparatus according to claim 1, wherein the photographing unit further comprises a lens group unit disposed between the light controller and the image sensor to perform aberration compensation or zooming on the first image and the second image.

6. The photographing apparatus according to claim 1, wherein the photographing unit further comprises a delay unit and a microlens array that are disposed between the light controller and the image sensor, the microlens array being disposed between the delay unit and the image sensor to perform zooming on the first image and the second image.

7. The photographing apparatus according to claim 1, wherein the light controller intersects the optical axis of the first lens or the optical axis of the second lens at a 45° angle.

8. The photographing apparatus according to claim 1, further comprising a processor coupled to the first control variable aperture and the second control variable aperture, wherein the processor is configured to provide a control signal to the first control variable aperture and the second control variable aperture to acquire the first image at the first time point and the second image at the second time point.

* * * * *